(12) United States Patent
Wu

(10) Patent No.: US 9,782,793 B2
(45) Date of Patent: Oct. 10, 2017

(54) INKJET PRINTING APPARATUS AND METHOD OF MAKING GRATINGS

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/161,713

(22) Filed: May 23, 2016

(65) Prior Publication Data

US 2016/0263616 A1 Sep. 15, 2016

Related U.S. Application Data

(62) Division of application No. 14/342,022, filed as application No. PCT/CN2013/089609 on Dec. 16, 2013, now Pat. No. 9,409,395.

(30) Foreign Application Priority Data

Jun. 26, 2013 (CN) .......................... 2013 1 0258000

(51) Int. Cl.
| | |
|---|---|
| *B05D 1/02* | (2006.01) |
| *B41J 3/28* | (2006.01) |
| *B41J 3/407* | (2006.01) |
| *B41J 2/145* | (2006.01) |
| *B41M 3/00* | (2006.01) |
| *B41J 2/01* | (2006.01) |
| *B41J 2/155* | (2006.01) |
| *B41J 2/15* | (2006.01) |
| *G02B 27/22* | (2006.01) |

(52) U.S. Cl.
CPC ........ *B05D 1/02* (2013.01); *B41J 2/01* (2013.01); *B41J 2/145* (2013.01); *B41J 3/28* (2013.01);
(Continued)

(58) Field of Classification Search
CPC ....... B41J 2/01; B41J 2/15; B41J 2/145; B41J 2/155; B05D 1/02
See application file for complete search history.

(56) References Cited

U.S. PATENT DOCUMENTS

| | | | |
|---|---|---|---|
| 2005/0202948 A1 | 9/2005 | Jensen | |
| 2006/0125903 A1* | 6/2006 | Fogarty | ...................... B41J 3/01 347/107 |
| 2012/0236075 A1 | 9/2012 | Ito | |

FOREIGN PATENT DOCUMENTS

| | | |
|---|---|---|
| CN | 102673130 A | 9/2012 |
| CN | 103317848 A | 9/2013 |

(Continued)

OTHER PUBLICATIONS

International Search Report dated Mar. 29, 2014; PCT/CN2013/089609.

(Continued)

*Primary Examiner* — Nathan Empie
(74) *Attorney, Agent, or Firm* — Ladas & Parry LLP; Loren K. Thompson

(57) ABSTRACT

An inkjet printing apparatus and a method of making gratings are provided. The inkjet printing apparatus comprises a base; a platform provided on the base configured to carry a substrate to be processed to linearly move in a first direction on the surface of the base; and a printhead assembly provided above the platform, wherein the printhead assembly includes a printhead support and a plurality of printheads provided on a side of the printhead support facing the platform, each of the plurality of printheads is provided with a nozzle, and the printhead assembly can move linearly in the first direction. The present invention is adaptable to using inkjet printing technology to make gratings.

17 Claims, 2 Drawing Sheets

(52) U.S. Cl.
CPC .............. *B41J 3/407* (2013.01); *B41M 3/008* (2013.01); *B41J 2/15* (2013.01); *B41J 2/155* (2013.01); *G02B 27/2214* (2013.01)

(56) References Cited

FOREIGN PATENT DOCUMENTS

CN      203317888 U    12/2013
JP      2006-224039 A   8/2006

OTHER PUBLICATIONS

First Chinese Office Action dated Sep. 2, 2014; Appln. No. 201310258000.7.
International Preliminary Report on Patentability issued Dec. 29, 2015; PCT/CN2013/089609.
USPTO RR mailed Apr. 28, 2015 in connection with U.S. Appl. No. 14/342,022.
USPTO NFOA dated Sep. 15, 2015 in connection with U.S. Appl. No. 14/342,022.
USPTO NOA mailed Apr. 4, 2016 in connection with U.S. Appl. No. 14/342,022.
USPTO Corrected Notice of Allowability dated Apr. 15, 2016 in connection with U.S. Appl. No. 14/342,022.

\* cited by examiner

INKJET PRINTING APPARATUS AND METHOD OF MAKING GRATINGS

TECHNICAL FIELD

Embodiments of the present invention relate to an inkjet printing apparatus and a method of making gratings.

BACKGROUND

The Stereo display has become a major trend of the display field. The basic principle of the stereo display is to give the stereo perception by binocular parallax, i.e., provide a left eye with a left-eye image and a right eye with a right-eye image, and the two offset images are separately present to the left and right eye within the time of duration of vision, then, a stereoscopic image having a depth will be seen after the brain gets the two different images.

Currently, a parallax barrier approach 3D is the most popular 3D display technology, and its basic structure includes a display unit and a parallax barrier under the display unit. The parallax barrier is a grating having transmission stripes and shading stripes arranged alternately, wherein the width of the transmission region is in a range of 20-70 microns, and the width of the shading region is about from tens of microns to hundreds of microns.

A grating is usually made by using photolithography or inkjet printing technology. When the photolithography is used to make a grating, it has a high precision, but the process is very complex and the production efficiency is low. Theoretically, an inkjet printing technology can be used to make a grating, that is, the shading stripes of the grating are directly printed on a substrate. This method is simple and can improve the efficiency of making the grating. If the inkjet printing technology is used to make a grating, after one shading stripe is printed, the printhead is required to be controlled precisely to move to a center of a next shading stripe for next printing. Thus, it requires a displacement control apparatus with a small stepping to make the grating because the distance between two adjacent shading stripes in the grating is very small, while it is hard for a transmission in the conventional technology to reach such precision, and it is very expensive even there is such one. The inkjet printing approach is hard to be implemented.

SUMMARY

Embodiments of the present invention provide an inkjet printing apparatus and a method of making gratings. The method can use inkjet printing technology to make high precise grating without making a apparatus with a small stepping. It reduces the cost of making gratings with the inkjet printing technology and improves the feasibility of making gratings with the inkjet printing technology.

An aspect of the present invention provides an inkjet printing apparatus comprising:

a base;

a platform provided on the base configured to carry a substrate to be processed to move linearly in a first direction on a surface of the base; and a printhead assembly provided above the platform, wherein the printhead assembly includes a printhead support and a plurality of printheads located on a side of the printhead support facing the platform, the plurality of printheads are provided with corresponding nozzles thereon, and the printhead assembly can move linearly in the first direction.

Another aspect of the present invention provides a method of making a grating comprising:

operating the printhead to perform a first print for generating a shading stripe of the grating on the substrate to be processed;

operating the platform to move a first distance along a first direction, operating the printhead assembly to move a second distance along the first direction, operating the printhead to perform a second print for generating the shading stripe of the grating on the substrate to be processed in a direction parallel to the direction of the first printed shading stripe of the grating, wherein the difference between the first distance and the second distance is determined from a space between the stripes to be made; and repeating the last step until all shading stripes of the grating are printed.

BRIEF DESCRIPTION OF THE DRAWINGS

Embodiments according to the present invention will be described in detail hereinafter in conjunction with accompanying drawings such that those skilled in the art would understand the present invention better, in which.

DETAILED DESCRIPTION OF THE PREFERRED EMBODIMENTS

Technical solutions according to the embodiments of the present invention will be described clearly and completely as below in conjunction with the accompanying drawings of embodiments of the present invention. It is apparent that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "the," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on,"

"under," "left," "right," or the like are only used to indicate relative position relationship, and when the position of the object which is described is changed, the relative position relationship may be changed accordingly.

Figure 1:
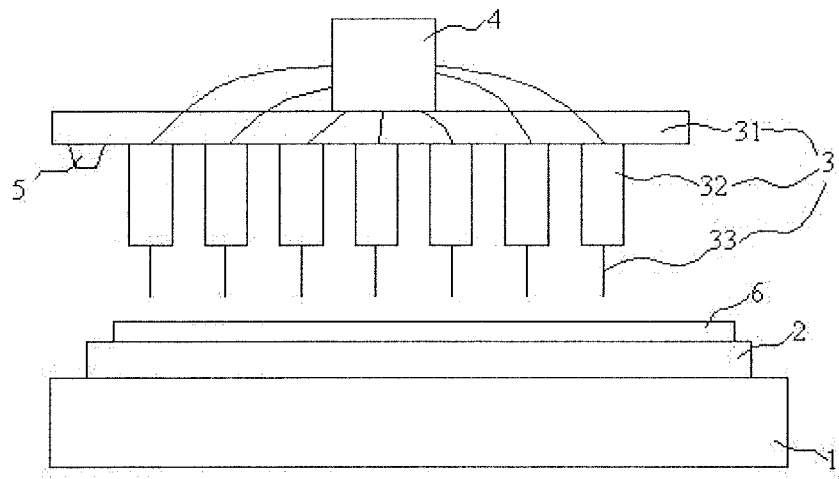
FIG. 1 is an overall structural schematic view of an inkjet printing apparatus according to an embodiment of the present invention.

FIG. 1 is an overall structural schematic view of an inkjet printing apparatus according to an embodiment of the present invention. As shown in FIG. 1, the inkjet printing apparatus according to an embodiment of the present invention comprises a base 1; and a platform 2 disposed on the base 1 for carrying a substrate 6 to be processed. The platform 2 can move in a linearly in a first direction on the surface of the base 1. The inkjet printing apparatus further comprises a printhead assembly 3 disposed above the platform 2. The printhead assembly 3 includes a printhead support 31 and a plurality of printheads 32 located on a side of the printhead support 31 facing the platform 2, and each of the plurality of printheads is provided with a nozzle 33. The printhead assembly 3 can move in the first direction linearly.

According to the inkjet printing apparatus in the embodiments of the present invention, both the platform 2 and the printhead assembly 3 can move along the first direction. During making a grating, the platform 3 and the printhead assembly 2 are moved simultaneously, and the difference of distances generated by moving the platform 3 and the printhead assembly 2 in the first direction is used for ensuring the space between two adjacent shading stripes of the grating to be made. In such a way, the grating with a high precision can be made without the need of the platform 3 and the printhead assembly 2 having high movement precision. It reduces the equipment cost of making gratings with the inkjet printing technology and improves the feasibility of making gratings with the inkjet printing technology.

Figure 3:
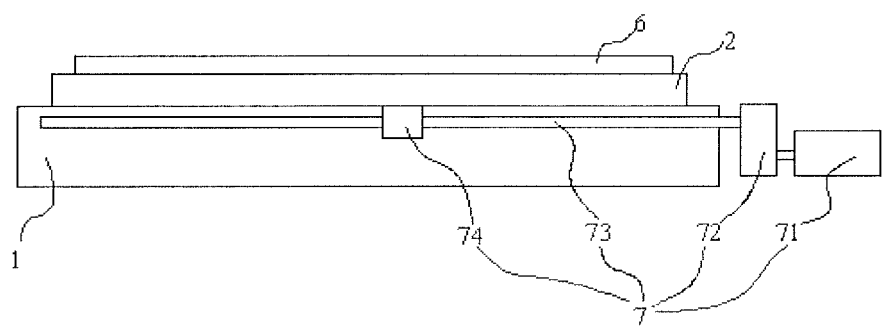
FIG. 3 is a structural schematic view of a platform movement assembly of the inkjet printing apparatus according to an embodiment of the present invention.

The printhead assembly 3 can have a variety of configurations. For example, as shown in FIG. 1, the printhead assembly 3 comprises a printhead support 31 and a plurality of printheads 32 arranged with uniform space on a side of the printhead support 31 facing the platform 2 in the first direction. Each of the plurality of printheads 32 has a nozzle 33 at an end thereof facing the platform 2. The diameter of the nozzle 33 equals to the width of the shading stripes of the grating to be made and the space between each two of the nozzles 33 is adjustable. When the printhead assembly 3 according to the embodiment as shown in FIG. 1 is used to perform grating printing, for printing different specifications of gratings, the space between each of the nozzles 33 is adjusted to make it adaptable to the space between the shading stripes of the grating to be made. Thus, only one set of the printhead assembly 3 is needed to meet requirements of making various specifications of gratings. The nozzle 33 can be connected with the printhead 32 in various ways, for example, a long slot is formed at an end of the printhead 32 facing the platform 2 in a first direction, and then the nozzle 33 is fastened on the slot through a bolt. When the adjustment is needed, it is only required to release the bolt, and the adjustment is implemented by sliding the nozzle 33 in the long slot. However, such an adjustable mechanism needs to be calibrated as the space between each of the nozzles 33 would occur a slight change after several printings are performed, thus the printhead assembly 3 of the embodiment shown in FIG. 3 is suitable for making small amount of gratings with different specifications.

According to above embodiment, other ways to adjust the positions of the nozzles are conceivable for those skilled in the art.

Figure 2:
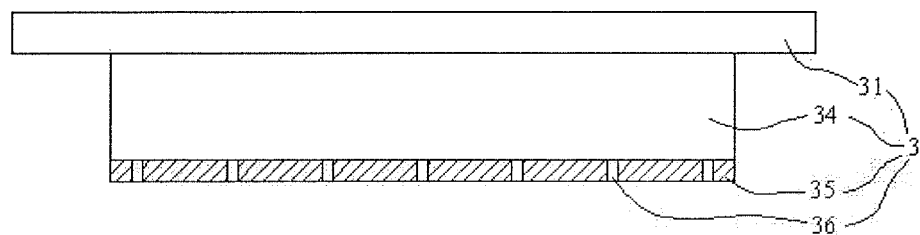
FIG. 2 is a structural schematic view of a printhead assembly of the inkjet printing apparatus according to an embodiment of the present invention.

The printhead assembly 3 can be arranged as shown in FIG. 2. The printhead assembly 3 comprises a printhead support 31 and printheads 34 located on a side of the printhead support 31 facing the platform 2. The printhead 34 is provided with a barrier 35 at a side facing the platform 2, and a plurality of jet or spout openings 36 are arranged on the barrier 35 with uniform space therebetween in a first direction. The diameter of the openings 36 is equal to the width of the shading stripes of the grating to be made. When the printhead assembly 3 according to the embodiment shown in FIG. 2 is used to perform grating printing, for printing different specifications of gratings, the barriers 35 can be equipped with opening designs with different spaces between the openings. For example, the barriers with openings having different spaces therebetween are made with a molding technology. For example, the openings 36 are formed on the barriers 35, which are adaptable to the space between the shading stripes of the grating to be made, and it only needs to mount a corresponding barrier 35 when making a grating. Such approach is easy to operate and can ensure the precision of the space between the openings 36. However, since different specifications of gratings require different specifications of barriers 35, the printhead assembly 3 according to the embodiment of FIG. 2 is suitable for making a large amount of gratings having the same specification.

According to above embodiment, other ways to adjust spaces between the openings are conceivable to those skilled in the art.

There are many ways for moving the platform 2 and the printhead assembly 3, which are only needed to meet the requirement that the platform 2 and the printhead assembly 3 can move on the plane of the platform 2 in same linear direction. For example, the driving mode can be selected from: a guide screw and a screw nut, a belting or a linear motor, and the structures thereof are common mechanical transmission mechanisms which can be implemented by those skilled in the art. Referring to FIG. 3, it shows a platform movement assembly 7 for controlling the movement of the platform according to an embodiment. When the platform 2 is required to move along the first direction, a guide screw is provided under the platform 2, a screw nut 74 is fitly connected with the guide screw 73, and the guide screw is arranged in the first direction. One end of the guide screw 73 is connected with a motor 71 through a gearbox 72, and the motor 71 is fixed on the base 1. Such structure has a low cost.

Figure 4:
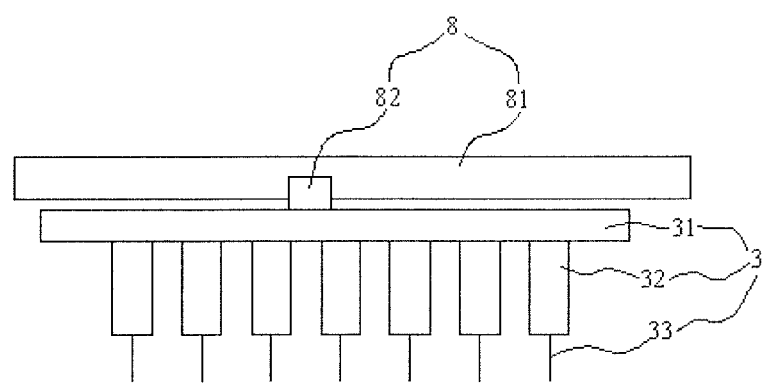
FIG. 4 is a structural schematic view of a printhead movement assembly of the inkjet printing apparatus according to an embodiment of the present invention.

FIG. 4 shows a printhead movement assembly 8 for controlling the movement of the printhead assembly 3 according to an embodiment. The printhead movement assembly 8 comprises a magnetic track 81 and a thrust coil 82. When the printhead assembly 3 is required to move along the first direction, it only needs to arrange the magnetic track 81 of the linear motor along the first direction, and then connect the printhead support 31 of the printhead assembly 3 with the thrust coil 82 of the linear motor. Such structure has a high transmission precision.

Further, for example, as shown in FIG. 1, it is preferable to configure an ink reservoir 4 for improving the amount of ink contained in the apparatus, saving the time of frequently filling inks and improving production efficiency. The ink reservoir 4 is communicated to the printhead 3 and continuously supplies inks to the printhead.

Further, as shown in FIG. 1, the printing system of the present application can includes a positioning device 5 to accurately and easily mount the substrate to be processed. The positioning device 5 is disposed on the printhead support 31 and used to position the relative location of the substrate 6 to be processed with respect to the printhead support 31.

Embodiments of the present invention also provide a method of making a grating with the inkjet printing apparatus according to any one of above embodiments. The method comprises:

operating the printhead to perform a first print for generating a shading stripe of the grating on the substrate to be processed;

operating the platform 2 to move a first distance along a first direction, operating the printhead assembly 3 to move a second distance along the first direction, operating the printhead to perform a second print for generating the shading stripe of the grating on the substrate 6 to be processed in a direction parallel to the direction of the first printed shading stripe of the grating, wherein the difference between the first distance and the second distance is determined from a space between the stripes to be made; and repeating the last step until all shading stripes of the grating are printed.

In the method of making gratings according to the embodiments of the present invention, as both the platform 2 and the printhead assembly 3 can move along the first direction, during making gratings, the platform 3 and the printhead assembly 2 are moved simultaneously, the difference of distances generated by moving the platform 3 and the printhead assembly 2 in the first direction is used for ensuring the space between two adjacent shading stripes of the grating to be made. Thus, the grating can be made with a high precision without the need of the platform 3 and the printhead assembly 2 having high movement precision. It reduces the equipment cost of making gratings with the inkjet printing technology and improves the feasibility of making gratings with the inkjet printing technology.

For example, when the grating to be made is a grating with equally spaced shading stripes and the space between the centers of two adjacent shading stripes of the grating to be made is W, the method of printing the shading stripes is as followed:

adjusting an absolute value V of the difference between the first distance and the second distance, the number N of the nozzles and the center distance B between two adjacent nozzles, to allow them satisfying the following conditions:

both B and V are a positive integer multiple of W;

at least one of B and V are an odd multiple of W;

$V \leq B(N-1)+W;$ when B≠W, B≠V.

operating the printhead to perform a first print for generating a shading stripe of the grating on the substrate to be processed;

operating the platform 2 to move a first distance along the first direction, operating the printhead assembly 3 to move a second distance along the first direction, operating the printhead to perform a second print for generating the shading stripe of the grating on the substrate to be processed; and repeating the last step until all shading stripes of the grating are printed.

When the method according to the embodiment is used to print a grating, first, the parameters V, B and N are adjusted according to the W of the grating to be printed to allow them satisfying the above conditions. The principles of above conditions are discussed below:

(1) B is a positive integer multiple of W: this condition aims to ensure the space between the shading stripes of the grating printed by each of the nozzles/openings is a positive integer multiple of W during the same printing;

(2) V is a positive integer multiple of W: this condition aims to ensure the space between the shading stripes of the gratings printed by the same nozzle/opening is a positive integer multiple of W during the multiple of printings;

(3) at least one of B and V is odd multiple of W: as the space between the printed adjacent shading stripes of grating(s) is even multiple of W when B is even multiple of W, and if V also is even multiple of W, the space between the shading stripes of gratings printed by the same nozzle/opening also is even multiple of W during the various printings, that is, only the shading stripes of gratings of space 2 W can be printed, but the shading stripes of gratings of the space W cannot be printed. Thus, this condition aims to ensure that the shading stripes of gratings with the space W can be printed;

(4) V≤B (N−1)+W: this condition limits the minimum number of nozzles/openings, which aims to ensure the space between the shading stripes of gratings through many nozzles/openings performing a multiple of printings when the space between the shading stripes of gratings cannot be ensured only by V value;

(5) if B≠W, B≠V: if B≠W, B=V, if the space between the printed shading stripes of gratings cannot equal to W no matter how many times the printings are performed, as such, the shading stripes of the gratings with a space W between adjacent two of them cannot be made.

Figure 5:
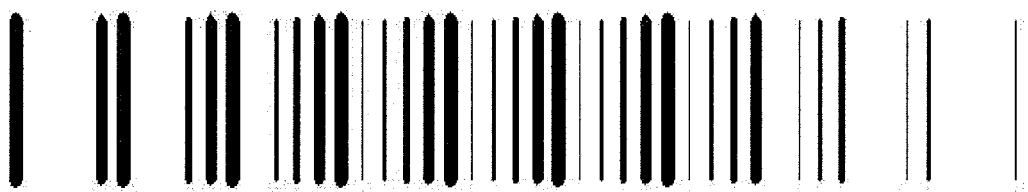
FIG. 5 is a schematic diagram of a specific grating stripes made by using the method of making a grating according to an embodiment of the present invention.

As shown in FIG. 5, FIG. 5 is a schematic diagram of the shading stripes of the grating made using the above method. The stripes having same width represent the stripes printed in the same printing in FIG. 5. The stripes from thick to thin (from broad to narrow) in the figure respectively represent the first printed shading stripes of the grating, the second printed shading stripes of the grating . . . , the fifth printed shading stripes of the grating. The shading stripes of the grating are designed to have different width in the schematic diagram solely for the purpose of easily distinguished. The actually printed shading stripes of the grating each have same width. In this embodiment, the parameters V, N, B and W satisfy the following relationships: V=4 W, B=5 W and N=7.

The embodiments of the present invention provide a method of making gratings, which can make high precise gratings without making a driving device having a small stepping. It reduces the equipment cost of making gratings. This method is simple, easy to operate and can make gratings with high efficiency.

The embodiments present invention provide an inkjet printing apparatus and a method of making gratings. As both the platform and the printhead assembly can move along the first direction, during making gratings, the platform and the printhead assembly are moved simultaneously, the difference of distances generated by moving the platform and the printhead assembly in the first direction is used for ensuring the space between two adjacent shading stripes of the gratings to be made. Thus, the gratings can be made with high precision without the need of the platform and the printhead assembly having high movement precision. It reduces the equipment cost of making gratings with the inkjet printing technology and improves the feasibility of making gratings with the inkjet printing technology.

The above described are only exemplary embodiments of the present application, but not intended to limit the scope of the present invention. It is apparent that those skilled in the art can make various modifications and variations to the present invention without departing from the spirit and scope of the present invention, and it is intended that the present invention contains these modifications, variations and any equivalents that fall into the scope of the present invention.

What is claimed is:

1. A method of making a grating using an inkjet printing apparatus, the inkjet printing apparatus comprising: a base; a platform provided on the base configured to carry a substrate to be processed to linearly move in a first direction on the surface of the base; a printhead assembly provided above the platform, wherein the printhead assembly includes a printhead support and a plurality of printheads provided on a side of the printhead support facing the platform, each of the plurality of printheads is provided with a nozzle, and the printhead assembly can move linearly in the first direction; and a platform movement assembly for controlling movement of the platform, the platform movement assembly including a guide screw provided under the platform, and a screw nut fitly connected to the guide screw, wherein the guide screw is arranged in the first direction; and one end of the guide screw is connected with a motor through a gearbox, and the motor is fixed on the base; the method comprising:

operating the printhead to perform a first print for generating a shading stripe of the grating on the substrate to be processed;

operating the platform to move a first distance along the first direction, operating the printhead assembly to move a second distance along the first direction, operating the printhead to perform a second print for generating the shading stripe of the grating on the substrate to be processed in a direction parallel to the direction of the first printed shading stripe of the grating, wherein a difference between the first distance and the second distance is determined by a space between the stripes to be made; and repeating the last step until all shading stripes of the grating are printed.

2. The method of making the grating according to claim 1, further comprising:

when the grating to be made is a grating with equally spaced shading stripes and the space between centers of two adjacent shading stripes of the grating to be made is W, adjusting an absolute value V of the difference between the first distance and the second distance, a number N of the nozzles, and a center distance B between two adjacent nozzles, allowing them to satisfy the conditions:

both B and V are a positive integer multiple of W;
at least one of B and V is an odd multiple of W;

$$V \leq B(N-1)+W;\text{ and}$$

if $B \neq W$, $B \neq V$.

3. The method of making the grating according to claim 1, further comprising:

when the grating to be made is a grating with equally spaced shading stripes and the space between centers of two adjacent shading stripes of the grating to be made is W, adjusting an absolute value V of the difference between the first distance and the second distance, a number N of the openings, and a center distance B between two adjacent openings, allowing them satisfying the conditions:

both B and V are a positive integer multiple of W;
at least one of B and V is an odd multiple of W;

$$V \leq B(N-1)-W;\text{ and}$$

if $B \neq W$, $B \neq V$.

4. The method of making the grating according to claim 1, wherein the plurality of printheads are arranged with uniform space therebetween on the side of the printhead support facing the platform in the first direction, the nozzle has a diameter which is equal to a width of a shading stripe of a grating to be made, and a space between each two of the nozzles is adjustable.

5. The method of making the grating according to claim 1, further comprising a printhead movement assembly for controlling movement of the printhead assembly, wherein the printhead movement assembly is a linear motor, the linear motor includes a magnetic track and a thrust coil disposed on the magnetic track and moved linearly along the magnetic track, the magnetic track is arranged along the first direction, and the thrust coil is connected with the printhead support.

6. The method of making the grating according to claim 1, further comprising an ink reservoir, wherein the ink reservoir is communicated with the plurality of printheads for supplying inks to the plurality of printheads.

7. The method of making the grating according to claim 1, further comprising a positioning device, the positioning device is disposed on the printhead support to position the substrate to be processed and the printhead support.

8. A method of making a grating using an inkjet printing apparatus, the inkjet printing apparatus comprising: a base; a platform provided on the base configured to carry a substrate to be processed to linearly move in a first direction on the surface of the base; a printhead assembly provided above the platform, wherein the printhead assembly includes a printhead support and at least a printhead provided on a side of the printhead support facing the platform, the printhead is provided with a plurality of spout openings, and the printhead assembly can move linearly in the first direction; and a platform movement assembly for controlling movement of the platform, the platform movement assembly including a guide screw provided under the platform, and a screw nut fitly connected to the guide screw, wherein the guide screw is arranged in the first direction; and one end of the guide screw is connected with a motor through a gearbox, and the motor is fixed on the base; the method comprising:

operating the printhead to perform a first print for generating a shading stripe of the grating on the substrate to be processed;

operating the platform to move a first distance along the first direction, operating the printhead assembly to move a second distance along the first direction, operating the printhead to perform a second print for generating the shading stripe of the grating on the substrate to be processed in a direction parallel to the direction of the first printed shading stripe of the grating, wherein a difference between the first distance and the second distance is determined by a space between the stripes to be made; and repeating the last step until all shading stripes of the grating are printed.

9. The method of making a grating according to claim 8, wherein the printhead is provided with a barrier at a side facing the platform, and a plurality of spout openings are arranged with equal space therebetween on the barrier in the first direction, the openings has a diameter which is equal to a width of a shading stripe of a grating to be made.

10. The method of making a grating according to claim 8, further comprising a printhead movement assembly for controlling movement of the printhead assembly, wherein the printhead movement assembly is a linear motor, the linear motor includes a magnetic track and a thrust coil disposed on the magnetic track and moved linearly along the magnetic track, the magnetic track is arranged along the first direction, and the thrust coil is connected with the printhead support.

11. The method of making a grating according to claim 8, further comprising an ink reservoir, the ink reservoir is communicated with the printhead for supplying inks to the plurality of printheads.

12. The method of making a grating according to claim 8, further comprising a positioning device, wherein the positioning device is disposed on the printhead support to position the substrate to be processed and the printhead support.

13. A method of making a grating using an inkjet printing apparatus, the inkjet printing apparatus comprising: a base; a platform provided on the base configured to carry a substrate to be processed to linearly move in a first direction on the surface of the base; and a printhead assembly provided above the platform, wherein the printhead assembly includes a printhead support and a plurality of printheads provided on a side of the printhead support facing the platform, each of the plurality of printheads is provided with a nozzle, and the printhead assembly can move linearly in the first direction, wherein the plurality of printheads are arranged with uniform space therebetween on the side of the printhead support facing the platform in the first direction, the nozzle has a diameter which is equal to a width of a shading stripe of a grating to be made, and a space between each two of the nozzles is adjustable; the method comprising:

operating the printhead to perform a first print for generating a shading stripe of the grating on the substrate to be processed;

operating the platform to move a first distance along the first direction, operating the printhead assembly to move a second distance along the first direction, operating the printhead to perform a second print for generating the shading stripe of the grating on the substrate to be processed in a direction parallel to the direction of the first printed shading stripe of the grating, wherein a difference between the first distance and the second distance is determined by a space between the stripes to be made; and repeating the last step until all shading stripes of the grating are printed.

14. The method of making a grating according to claim 13, further comprising a platform movement assembly for controlling movement of the platform, wherein the platform movement assembly includes a guide screw provided under the platform, a screw nut fitly connected to the guide screw arranged in the first direction, one end of the guide screw is connected with a motor through a gearbox, and the motor is fixed on the base.

15. The method of making a grating according to claim 13, further comprising a printhead movement assembly for controlling movement of the printhead assembly, wherein the printhead movement assembly is a linear motor, the linear motor includes a magnetic track and a thrust coil disposed on the magnetic track and moved linearly along the magnetic track arranged along the first direction, and the thrust coil is connected with the printhead support.

16. The method of making a grating according to claim 13, further comprising an ink reservoir, wherein the ink reservoir is communicated to the plurality of printheads for supplying inks to the plurality of printheads.

17. The method of making a grating according to claim 13, further comprising a positioning device, wherein the positioning device is disposed on the printhead support to position the substrate to be processed and the printhead support.

* * * * *